United States Patent
Otis, Jr. et al.

(10) Patent No.: US 8,084,150 B2
(45) Date of Patent: Dec. 27, 2011

(54) FUEL CARTRIDGES AND APPARATUS INCLUDING THE SAME

(75) Inventors: David R. Otis, Jr., Corvallis, OR (US); Heather L. Stokes, Monroe, OR (US)

(73) Assignee: Eveready Battery Company, Inc., St. Louis, MO (US)

( * ) Notice: Subject to any disclaimer, the term of this patent is extended or adjusted under 35 U.S.C. 154(b) by 2193 days.

(21) Appl. No.: 10/833,974

(22) Filed: Apr. 28, 2004

(65) Prior Publication Data

US 2005/0244683 A1 Nov. 3, 2005

(51) Int. Cl.
*H01M 8/04* (2006.01)

(52) U.S. Cl. .......... 429/20; 429/416; 429/421; 429/427; 429/434; 429/492; 429/515

(58) Field of Classification Search .......... None
See application file for complete search history.

(56) References Cited

U.S. PATENT DOCUMENTS

| | | | |
|---|---|---|---|
| 1,146,983 A | 5/1922 | Bowman | |
| 3,450,500 A | 6/1969 | Setzer et al. | |
| 4,193,978 A | 3/1980 | Muller et al. | |
| 4,354,822 A | 10/1982 | Madsen et al. | |
| 4,493,878 A | 1/1985 | Horiba et al. | |
| 4,866,250 A | 9/1989 | Pasbrig | |
| 5,359,968 A * | 11/1994 | Shiraishi et al. | 123/3 |
| 5,432,023 A | 7/1995 | Yamada et al. | |
| 5,504,471 A | 4/1996 | Lund | |
| 5,644,342 A | 7/1997 | Argyres | |
| 5,673,939 A | 10/1997 | Bees et al. | |
| 5,789,093 A | 8/1998 | Malhi | |
| 5,797,269 A | 8/1998 | Nishimura et al. | |
| 5,812,156 A | 9/1998 | Bullock et al. | |
| 5,939,033 A | 8/1999 | Kendall et al. | |
| 5,962,155 A | 10/1999 | Kuranaka et al. | |
| 5,976,725 A | 11/1999 | Gamo et al. | |
| 6,007,186 A | 12/1999 | Erni | |
| 6,015,209 A | 1/2000 | Barinaga et al. | |
| 6,039,430 A | 3/2000 | Helterline et al. | |
| 6,054,228 A | 4/2000 | Cisar et al. | |
| 6,057,051 A | 5/2000 | Uchida et al. | |
| 6,089,687 A | 7/2000 | Helterline | |
| 6,113,208 A | 9/2000 | Benjamin et al. | |
| 6,129,861 A | 10/2000 | Meusinger et al. | |
| 6,198,250 B1 | 3/2001 | Gartstein et al. | |
| 6,268,077 B1 | 7/2001 | Kelley et al. | |
| 6,294,276 B1 | 9/2001 | Ogino | |
| 6,530,233 B1 | 3/2003 | Nakamura et al. | |

(Continued)

FOREIGN PATENT DOCUMENTS

EP 0 940 260 9/1999

(Continued)

OTHER PUBLICATIONS cartridge—Definition from the Merriam-Webster Online Dictionary. http://www.merriam-webster.com/dictionay/cartridge, accessed Oct. 24, 2008.*

*Primary Examiner* — Ula C. Ruddock
*Assistant Examiner* — A. Echelmeyer
(74) *Attorney, Agent, or Firm* — Russell H. Toye, Jr.

(57) ABSTRACT

A fuel cartridge includes a fuel containing substance and a heater in thermal communication with the fuel containing substance.

25 Claims, 6 Drawing Sheets

U.S. PATENT DOCUMENTS

| | | |
|---|---|---|
| 6,534,033 B1 | 3/2003 | Amendola |
| 6,713,201 B2 | 3/2004 | Bullock et al. |
| 6,724,194 B1 | 4/2004 | Barton |
| 6,828,049 B2 | 12/2004 | Bullock et al. |
| 6,887,596 B2 | 5/2005 | Leban |
| 2001/0045364 A1 | 11/2001 | Hockaday et al. |
| 2001/0052433 A1 | 12/2001 | Harris et al. |
| 2002/0018925 A1 | 2/2002 | Merin Celemin et al. |
| 2002/0127447 A1 | 9/2002 | Edlund et al. |
| 2002/0154915 A1 | 10/2002 | Bullock et al. |
| 2003/0008186 A1 | 1/2003 | Dickman et al. |
| 2003/0022041 A1 | 1/2003 | Barton et al. |
| 2003/0022042 A1 | 1/2003 | Wells et al. |
| 2003/0051785 A1 | 3/2003 | Gauthier et al. |
| 2003/0082426 A1 | 5/2003 | Bullock et al. |
| 2003/0082427 A1 | 5/2003 | Prasad et al. |
| 2003/0124408 A1 | 7/2003 | Hojo et al. |
| 2003/0129464 A1 | 7/2003 | Becerra et al. |
| 2003/0136453 A1 | 7/2003 | Johnson |
| 2003/0138676 A1 | 7/2003 | Leban |
| 2003/0138679 A1 | 7/2003 | Prasad et al. |
| 2004/0009121 A1 | 1/2004 | Jensen et al. |
| 2004/0023087 A1* | 2/2004 | Redmond .................. 429/19 |
| 2004/0076861 A1 | 4/2004 | Mann et al. |
| 2004/0214056 A1* | 10/2004 | Gore ........................... 429/20 |
| 2005/0079128 A1 | 4/2005 | de Vos et al. |

FOREIGN PATENT DOCUMENTS

| | | |
|---|---|---|
| EP | 1 253 522 | 10/2002 |
| EP | 1 353 393 | 10/2002 |
| EP | 1 306 918 | 5/2003 |
| EP | 1396472 A2 | 3/2004 |
| GB | 1568374 A | 5/1980 |
| GB | 2283235 A | 5/1995 |
| JP | 09-213359 A | 8/1997 |
| JP | 10-321248 A | 12/1998 |
| JP | 2001-185184 A | 7/2001 |
| JP | 2001-295996 A | 10/2001 |
| JP | 2001-313047 A | 11/2001 |
| WO | WO-98/20282 A1 | 5/1998 |
| WO | WO-00/24076 A | 10/1998 |
| WO | WO 00/35032 | 6/2000 |
| WO | WO01/79012 | 10/2001 |
| WO | WO-03/043112 A | 5/2003 |
| WO | WO-2004/001883 A2 | 12/2003 |

* cited by examiner

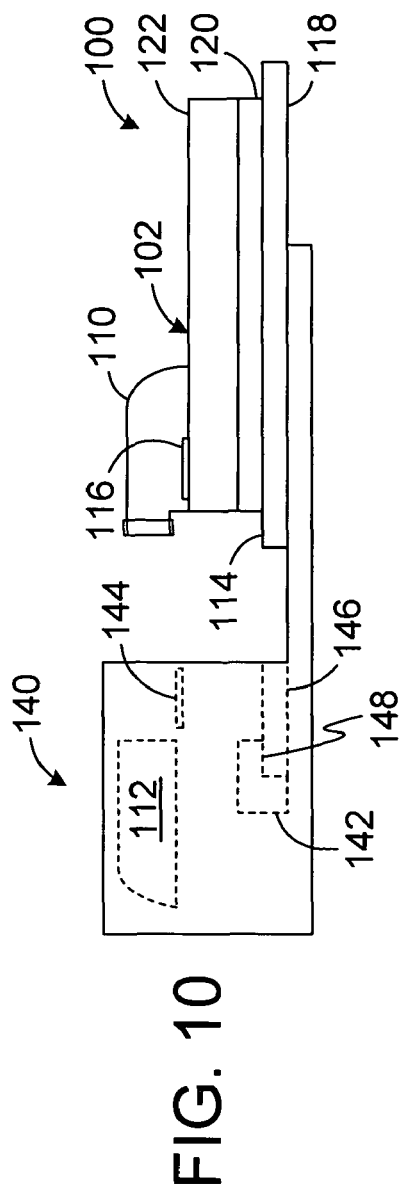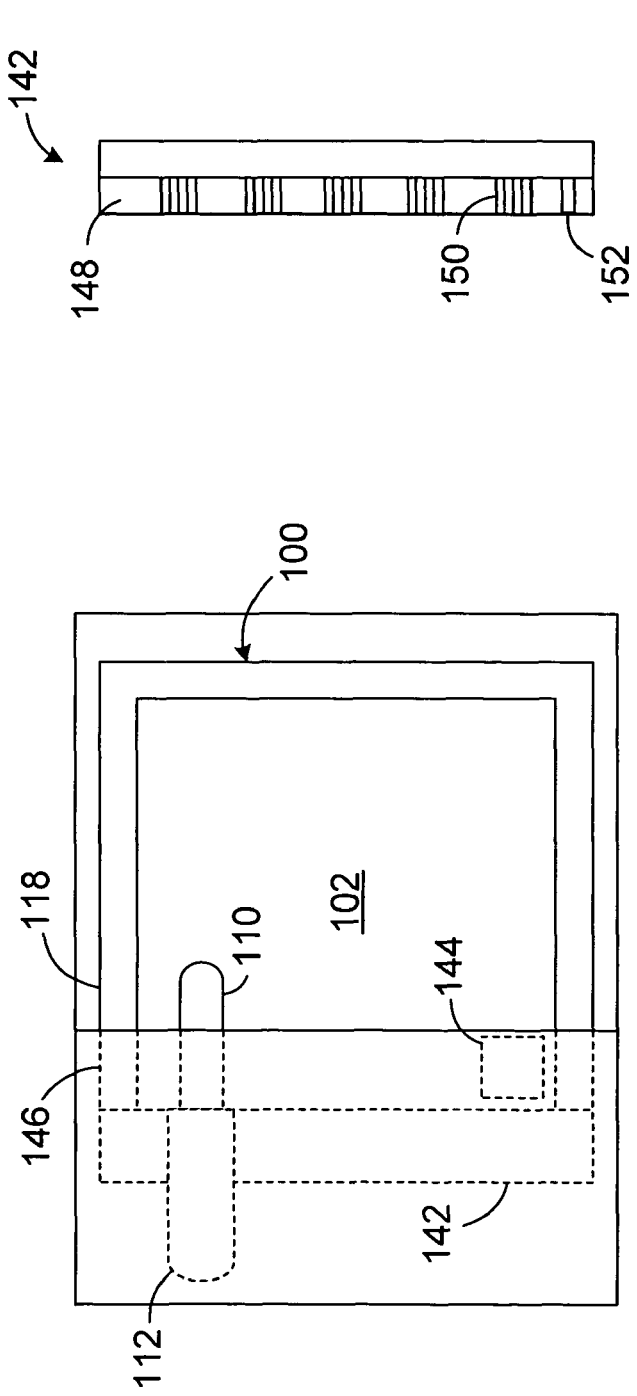

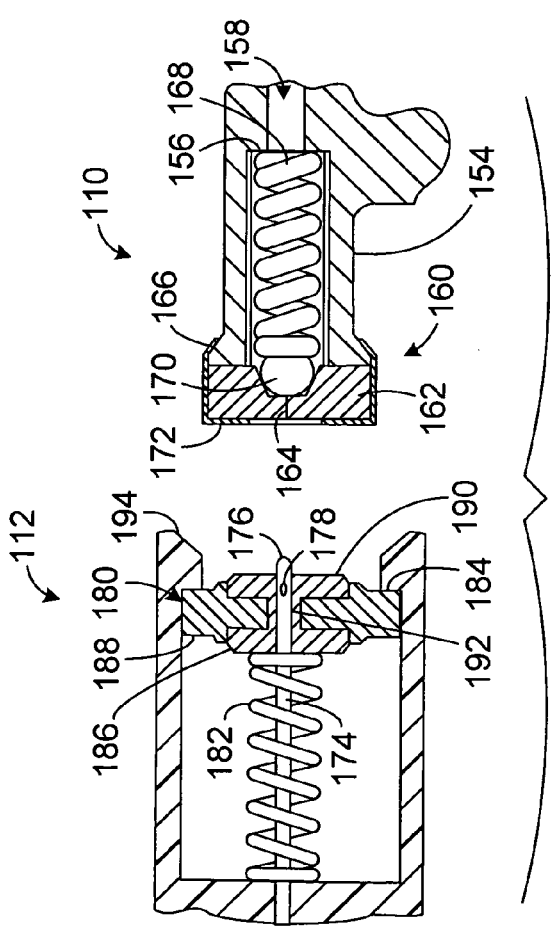
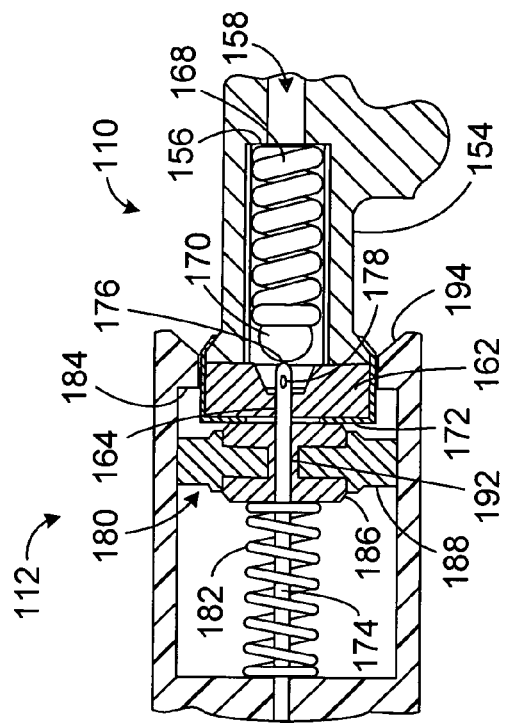
FIG. 13
FIG. 14

FUEL CARTRIDGES AND APPARATUS INCLUDING THE SAME

BACKGROUND OF THE INVENTIONS

1. Field of the Inventions

The present inventions are related to fuel cartridges that may be used, for example, in combination with fuel cells.

2. Background

Many devices are fueled by fuel that is stored in a fuel cartridge. Although the present inventions are not limited to fuel cartridges that are used in conjunction with any particular type of device, fuel cells are one example of a device that may consume fuel stored in a fuel cartridge, and the present inventions are discussed in the context of fuel cells for illustrative purposes only. Fuel cells convert fuel and oxidant into electricity and a reaction product. Fuel cells that employ hydrogen as the fuel and oxygen as the oxidant, for example, produce water and/or water vapor as the reaction product. Some fuel cartridges used in conjunction with fuel cells store a fuel containing substance, such as a chemical compound, that releases the gaseous fuel in response to the application of heat.

The inventors herein have determined that conventional fuel cartridges, especially those used in conjunction with fuel cells, are susceptible to improvement. More specifically, the inventors herein have determined that conventional fuel cartridges cause the gaseous fuel to be released in a manner that is susceptible to improvement. The inventors herein have also determined that the configuration of conventional fuel cartridges is susceptible to improvement.

SUMMARY OF THE INVENTIONS

A fuel cartridge in accordance with one embodiment of a present invention includes a fuel containing substance that releases fuel in response to an application of heat, a heater that heats the fuel containing substance in response to the receipt of energy, and an information storage device that stores an energy value corresponding to the minimum amount of energy that, when supplied to the heater, will cause the fuel containing substance to release all of the fuel contained therein.

A fuel cartridge in accordance with one embodiment of a present invention includes a fuel containing substance that releases fuel in response to an application of heat, means for heating the fuel containing substance in response to a receipt of energy, and means for storing an energy value that corresponds to the minimum amount of energy that, when supplied to the means for heating, will cause the fuel containing substance to release all of the fuel contained therein.

A device in accordance with one embodiment of a present invention includes an electrochemical cell and a fuel cartridge, operably connected to the electrochemical cell, having a fuel containing substance that releases fuel in response to an application of heat, a heater, in thermal communication with the fuel containing substance, that heats the fuel containing substance in response to a receipt of energy, and an information storage device that stores an energy value corresponding to the minimum amount of energy that, when supplied to the heater, will cause the fuel containing substance to release all of the fuel contained therein.

A method in accordance with one embodiment of a present invention includes the steps of connecting a fuel cartridge, including a heater and a fuel containing substance that releases fuel in response to an application of heat, to a host device, and transferring an energy value, corresponding to the minimum amount of energy required by the heater to cause the fuel containing substance to release all of the fuel contained therein, from the fuel cartridge to the host device.

A fuel cartridge in accordance with one embodiment of a present invention includes a base member, a heater array, including at least one heater and a least one heater conductor operably connected to the at least one heater, carried by the base member, and a housing carried by the base member and positioned on the base member such that the housing covers a substantial majority of the heater array and a relatively small portion of the at least one heater conductor extends beyond the housing.

A fuel cartridge in accordance with one embodiment of a present invention includes a base member defining a surface, a housing carried by the base member and positioned on the base member such that at least one portion of the base member surface is uncovered by the housing, and at least one electrical connector carried by the uncovered portion of the base member surface.

A method of making a fuel cartridge in accordance with one embodiment of a present invention includes the steps of forming a heater array, including at least one heater and a least one heater conductor operably connected to the at least one heater, on a base member, positioning a housing on the base member such that the housing covers a substantial majority of the heater array and a relatively small portion of the at least one heater conductor extends beyond the housing, and filling at least a portion of the housing with a fuel containing substance that releases fuel in response to the application of heat.

BRIEF DESCRIPTION OF THE DRAWINGS

Detailed description of embodiments of the inventions will be made with reference to the accompanying drawings.

FIG. 10 is a side view showing a fuel cartridge and a cartridge socket in accordance with one embodiment of a present invention in a disconnected state.

FIG. 11 is a side view showing the fuel cartridge and cartridge socket illustrated in FIG. 10 in a connected state.

FIG. 12 is a bottom view of a portion of the cartridge socket illustrated in FIG. 10.

FIG. 13 is a side, partial section view of a connector arrangement in accordance with an embodiment of a present invention in a disconnected state.

FIG. 14 is a side, partial section view of the connector arrangement illustrated in FIG. 13 in a connected state.

DETAILED DESCRIPTION OF THE EMBODIMENTS

The following is a detailed description of the best presently known modes of carrying out the inventions. This description is not to be taken in a limiting sense, but is made merely for the purpose of illustrating the general principles of the inventions. Additionally, although the inventions herein are discussed in the context of fuel cell systems and devices powered by fuel cells (collectively "host devices"), the fuel cartridges described herein are not limited solely to use with fuel cells. With respect to fuel cells, the present inventions are applicable to a wide range of fuel cell technologies, including those presently being developed or yet to be developed. Thus, although various exemplary fuel cartridges are described below with reference to a proton exchange membrane (PEM) fuel cell, other types of fuel cells, such as solid oxide fuel cells, are equally applicable to the present inventions. It should also be noted that detailed discussions of fuel cell structures, the structures of other fuel consuming devices, and the internal operating components of host devices powered thereby that are not pertinent to the present inventions have been omitted for the sake of simplicity.

Figure 2:
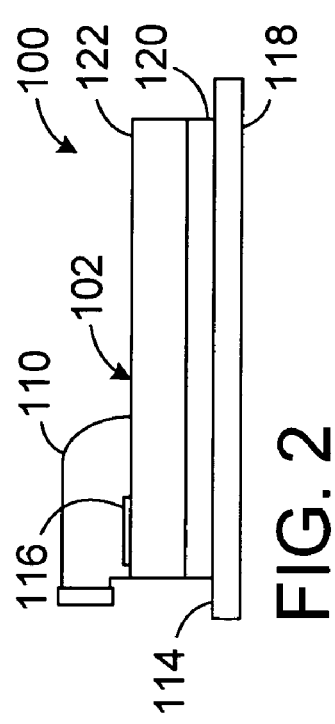
FIG. 2 is a side view of the fuel cartridge illustrated in FIG. 1.
Figure 3:
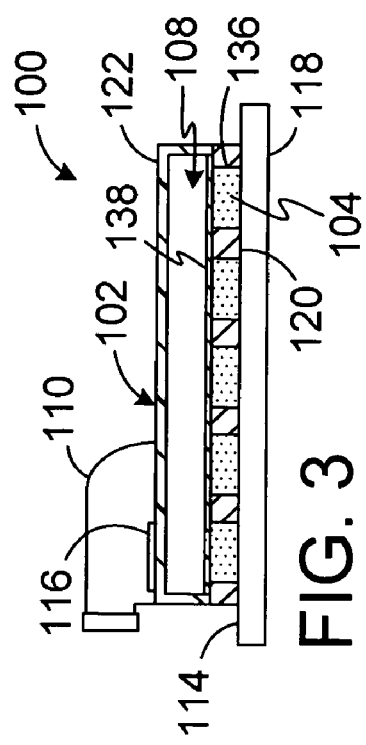
FIG. 3 is a side, partial section view of the fuel cartridge illustrated in FIG. 1.
Figure 1:
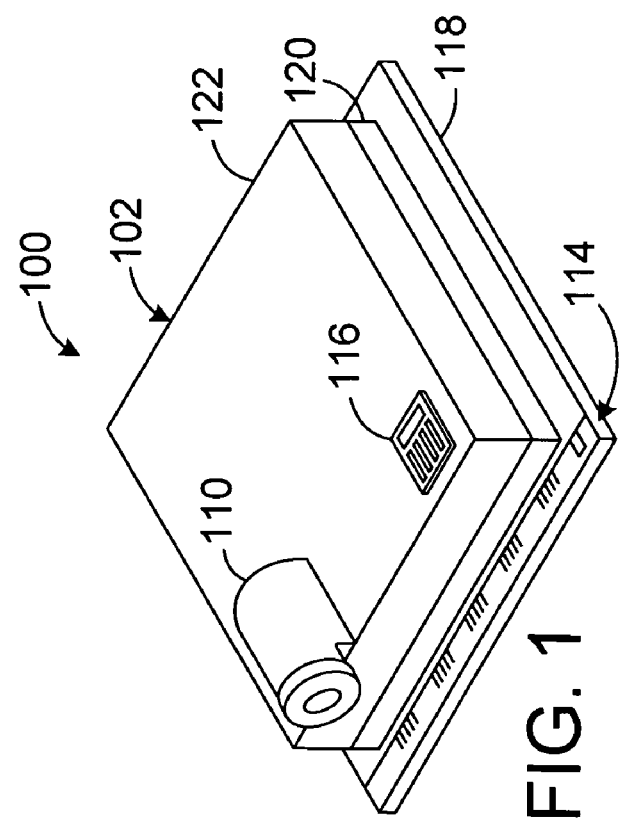
FIG. 1 is an isometric view of a fuel cartridge in accordance with one embodiment of a present invention.

As illustrated for example in FIGS. 1-3, a fuel cartridge 100 in accordance with one embodiment of a present invention includes a housing 102 and that stores a plurality of individual fuel containing substance quantities 104. The fuel containing substance is preferably a substance that will release gaseous fuel in response to the application of heat and a plurality of heaters 106 (FIG. 4) are provided to heat the fuel containing substance. The illustrated embodiment includes one heater for each fuel containing substance quantity 104. Nevertheless, such an arrangement is not required and the heater/fuel containing substance quantity ratio may be varied from cartridge to cartridge or within a single cartridge. For example, there could be a plurality of heaters 106 for a fuel containing substance quantity 104 or a single heater for a plurality of fuel containing substance quantities. Fuel, which is released from the fuel containing substance into an open region 108 within the housing 102, exits the fuel cartridge 100 by way of a fluid connector 110. The fluid connector 110 also acts as a cap to prevent gas from entering or exiting the housing 102 unless the connector has mated with a corresponding fluid connector 112 in the manner discussed below with reference to FIGS. 10-14.

There are a variety of advantages associated with the use of individual fuel containing substance quantities. For example, the release of fuel from the fuel containing substance can be precisely controlled by simply controlling the actuation of the heaters 106. Individual heaters 106 may be actuated at predetermined intervals as long an fuel is being drawn from the cartridge 100. Alternatively, the host device may be used to calculate the amount of fuel required to, for example, power a fuel cell based on operating parameters such as current draw or voltage and actuate individual heaters 106 accordingly.

The exemplary fuel cartridge 100 is also provided with an electrical connector 114 and an information storage device 116. The electrical connector 114 allows the host device to control the operation of the heaters 106. The information storage device 116, which includes data concerning the fuel cartridge 100 that may be used by the host device, may be carried on the exterior of the housing 102, as shown. Alternatively, the information storage device 116 may be positioned in a protected area within the housing 102, or within its own housing, and connected to a data link that is carried on the exterior of either the housing. The data includes, for example, data that describes the fuel type and the amount of gaseous fuel contained in each of the fuel containing substance quantities 104. The data stored on the information storage device 116 also preferably includes the respective amounts of energy that must be supplied to each heater 106 in order to completely release all of the gaseous fuel from the associated fuel containing substance quantity 104. The heater energy data values may be identical in those instances where the fuel containing substance quantities 104 are identical, or may be different in those instances where the fuel containing substance quantities are different.

There are a variety of advantages associated with the present information storage device 116. For example, fuel cartridges with the information storage device 116 can produce gaseous fuel in a manner that is more efficient that conventional cartridges because the present fuel cartridges provide the host device with heater energy data that allows the host device to supply the minimum amount of energy needed to fully consume each fuel containing substance quantity 104. As a result, the fuel containing substance quantities 104 will not be under utilized (i.e. retain gaseous fuel) as would be the result if an insufficient amount of energy was delivered to the heaters 106. Nor will more energy than necessary be supplied to the heaters 106, which unnecessarily increases the parasitic load on the host device.

Although the present inventions are not limited to any particular fuel or fuel containing substance, one type of fuel containing substance is fuel containing chemical compounds that are used to provide hydrogen. Sodium borohydride, for example, is a stable compound in a solution or gel that will readily form hydrogen in the presence of heat, as illustrated by the following chemical equation: $NaBH_4 + 2H_2O \rightarrow 4 H_2 + NaBO_2$. The solution should also contain a sufficient concentration of sodium hydroxide to prevent the formation of any appreciable amount of hydrogen during storage. Other exemplary fuel containing substances include borane hydrozene complexes and metal hydrides. The exemplary fuel containing substance, which is a sodium borohydride solution that consists of 40% $NaBH_4$, 30% $NaOH$ and 30% $H_2O$ by mass, will form hydrogen when heated to about 80° C. to 100° C. However, depending on the fuel containing substance employed, heating temperatures may range from 80° C. to 500° C.

Figure 4:
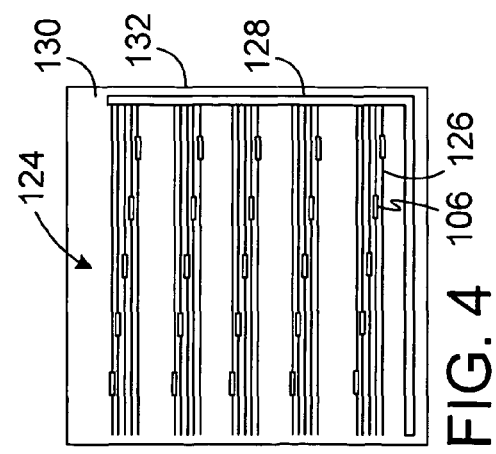

In the exemplary implementation illustrated in FIGS. 1-3, the housing 102 includes a base 118 including a planar surface, a fuel storage structure 120, a cover 122. In addition to supporting the fuel storage structure 120, the exemplary planar surface of the base 118 includes the heaters 106 (and associated circuitry) and defines a portion of the electrical connector 114. Referring first to FIG. 4, the heaters 106 are preferably resistors that may be selectively actuated, by driving current through the selected resistor(s), to generate heat that is applied to the associated fuel containing substance quantity 104. Other suitable heaters include, for example, RF heating devices and microwave heating devices. The heaters 106 are positioned in an array 124 that includes a plurality of conductors 126. Each of the conductors 126 is connected to a respective heater 106 and to a common conductor 128. Suitable materials for the conductors 126 and 128 include gold, aluminum and copper. A particular heater 106 in the exemplary array 124 is activated by connecting the corresponding conductor 126 to a voltage source and the common conductor 128 to ground. Multiple heaters 106 may be simultaneously activated by connecting a plurality of the conductors 126 to a voltage source and the common conductor 128 to ground.

Figure 5:
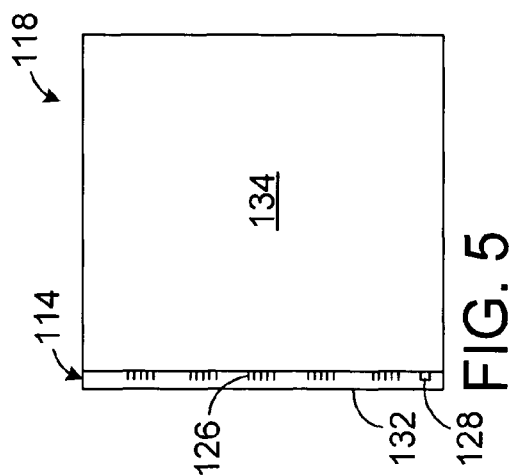

The individual heater 106/conductor 126 pairs, which are electrically isolated from one another (except for the aforementioned connection of each heater to the common conductor) by insulating material 130, may be formed on a substrate 132. Suitable techniques include, for example, conventional metal deposition techniques. The substrate 132 is preferably formed from a polyimide plastic such as Kapton® or polypropylene that can maintain its mechanical, chemical and electrical properties over a wide range of temperatures. Once formed, the heaters 106 and the substantial majority of the conductors 126 and 128 are covered by a barrier layer 134 (FIG. 5) that has relatively high thermal conductivity, but insulates the heaters 106 and conductors 126 and 128 both electrically and chemically from the fuel containing substance. Suitable materials for the barrier layer 134 include silica, silicon dioxide, silicon nitride, silicon carbide, glass, polymers such as polyimides, and epoxy-amine composites. Photoresists of SU-8 epoxy based negative resist (from MicroChem Corp.) and solder mask layers may also be used.

It should be noted here that the present inventions are not limited to any particular heater system. Other exemplary heater and heater addressing systems, which are disclosed in the context of ink jet printing devices, are disclosed in U.S. Pat. Nos. 5,504,471, 5,644,342 and 6,007,186, which are incorporated herein by reference.

In the illustrated embodiment, the respective portions of the conductors 126 and 128 that are not covered by the barrier layer 134 define the contacts on the electrical connector 114. The corresponding portion of the base 118 supports the contacts. Such an arrangement simplifies the manufacturing process because it eliminates the need to form a separate connector, mount it on the cartridge and connect it to the conductors 126 and 128.

Figure 6:
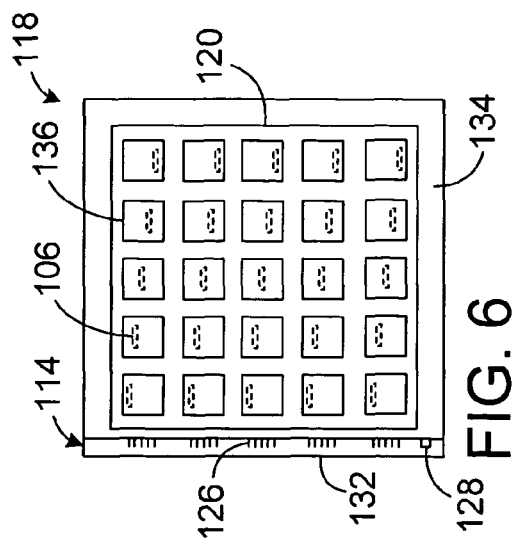
FIGS. 4-9 are plan views showing various aspects of the fuel cartridge illustrated in FIG. 1.
Figure 9:
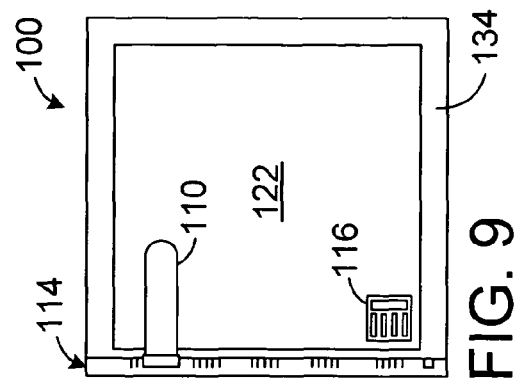

As illustrated for example in FIG. 6, the fuel storage structure 120 includes a plurality of individual fuel storage areas 136 that hold the individual fuel containing substance quantities 104. The fuel storage areas 136 may be of any suitable size, shape and number. In the exemplary embodiment, the fuel storage areas 136 are arranged in an array that corresponds to the array of heaters 106. There are variety of considerations that may be taken into account when implementing this aspect of the present fuel cartridge 100. For example, the precision at which the fuel cartridge 100 can produce gaseous fuel will increase with the number of individual fuel containing substance quantities (for a given overall volume of fuel containing substance within the cartridge). As such, the density of the fuel storage areas 136 may be maximized by minimizing the space between the fuel storage areas. It is, however, also desirable to insure that the actuation of a particular heater 106 will only cause the fuel containing substance quantity 104 associated with that heater to emit gaseous fuel and will not substantially heat the fuel containing substance quantities (i.e. apply enough heat to cause the release of fuel) associated with other heaters. Accordingly, the spacing between the fuel storage areas 136 will also be dependent upon the insulating properties of the material used to form the fuel storage structure 120.

Other factors may also be considered when selecting the fuel storage area volume. Some host devices include batteries that provide power at system startup and store excess power in those instances where the associated host device does not consume all of the power generated by the fuel cell system. Here, the volume of the fuel storage areas 136 may be selected so as to correspond to the capacity of the battery, i.e. the fuel containing substance in one fuel storage area will produce just enough hydrogen to allow the fuel cell system to fully charge the battery. The respective volumes of the fuel storage areas 136 are equal in the exemplary embodiment. Nevertheless, the volume may also vary from fuel storage area to fuel storage area.

The fuel storage structure 120 may be secured to the base 118 by, for example, any one of laser welding, vibration welding and adhesive. Once fuel storage structure 120 has been secured to the base 118, the fuel storage areas 136 may be filled with the individual fuel containing substance quantities 104. A gas permeable/liquid impermeable membrane 138 (FIGS. 3 and 8) is then positioned over the fuel storage structure 120 in order to prevent the fuel containing substance from leaking into the open region 108 as the fuel cartridge 100 is moved and reoriented. Suitable gas permeable/liquid impermeable materials include porous hydrophobic membrane materials such as, for example, GORE-TEX® material and CELGARD® hollow fiber membrane material.

The exemplary cover 122 is configured to so as to have the same size and shape (viewed in plan) as the fuel storage structure 120. The volume of the open region 108 should be such that the gaseous fuel released from a single fuel storage area 136 will, when the fluid connector 110 is open, readily flow out of the cartridge 100 to the associated fuel consuming device regardless of orientation. This is particularly useful because the host device may be movable and operated in a variety of orientations.

Figure 15:
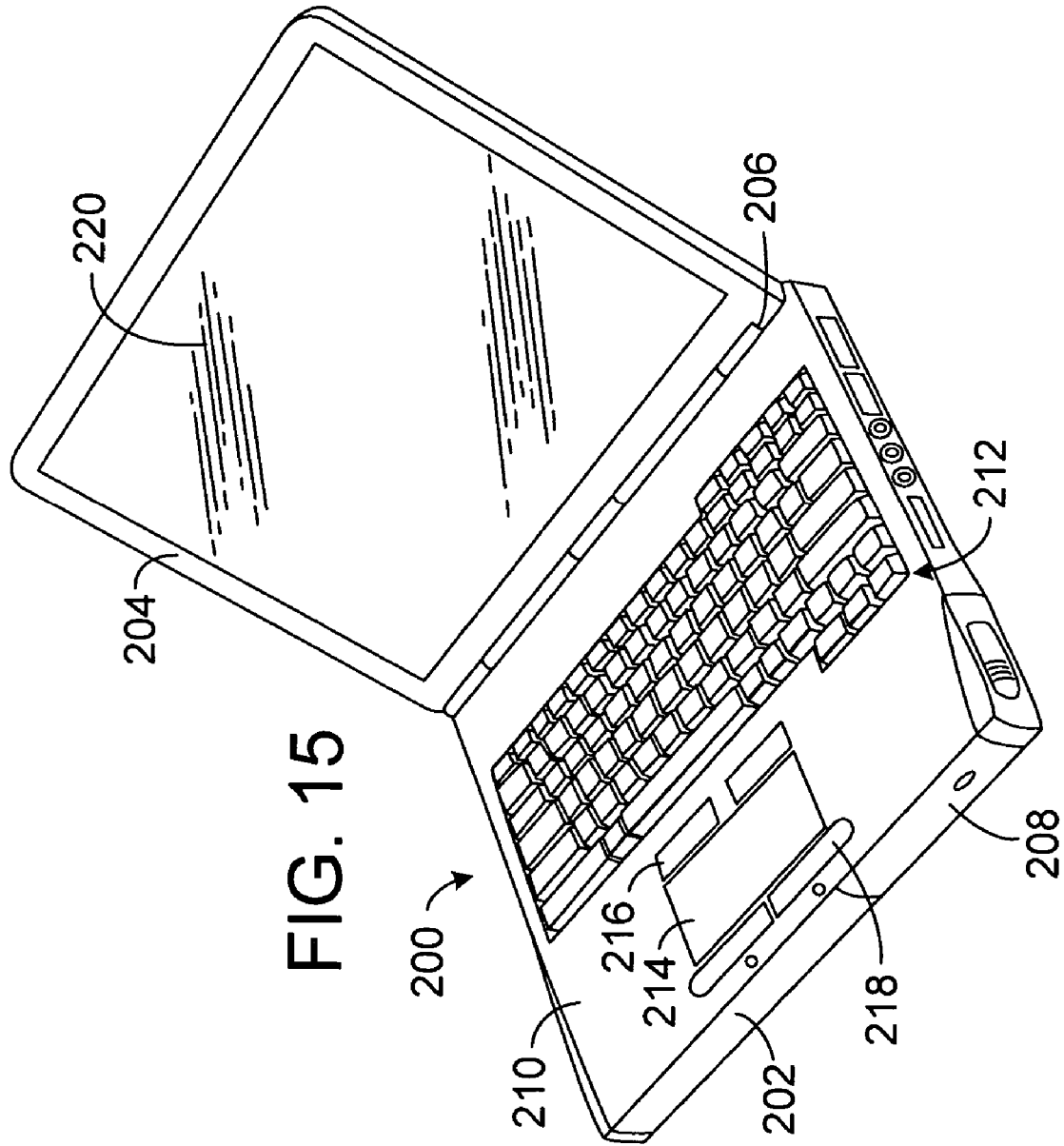
FIG. 15 is a perspective view of a notebook computer in accordance with an embodiment of a present invention.
Figure 16:
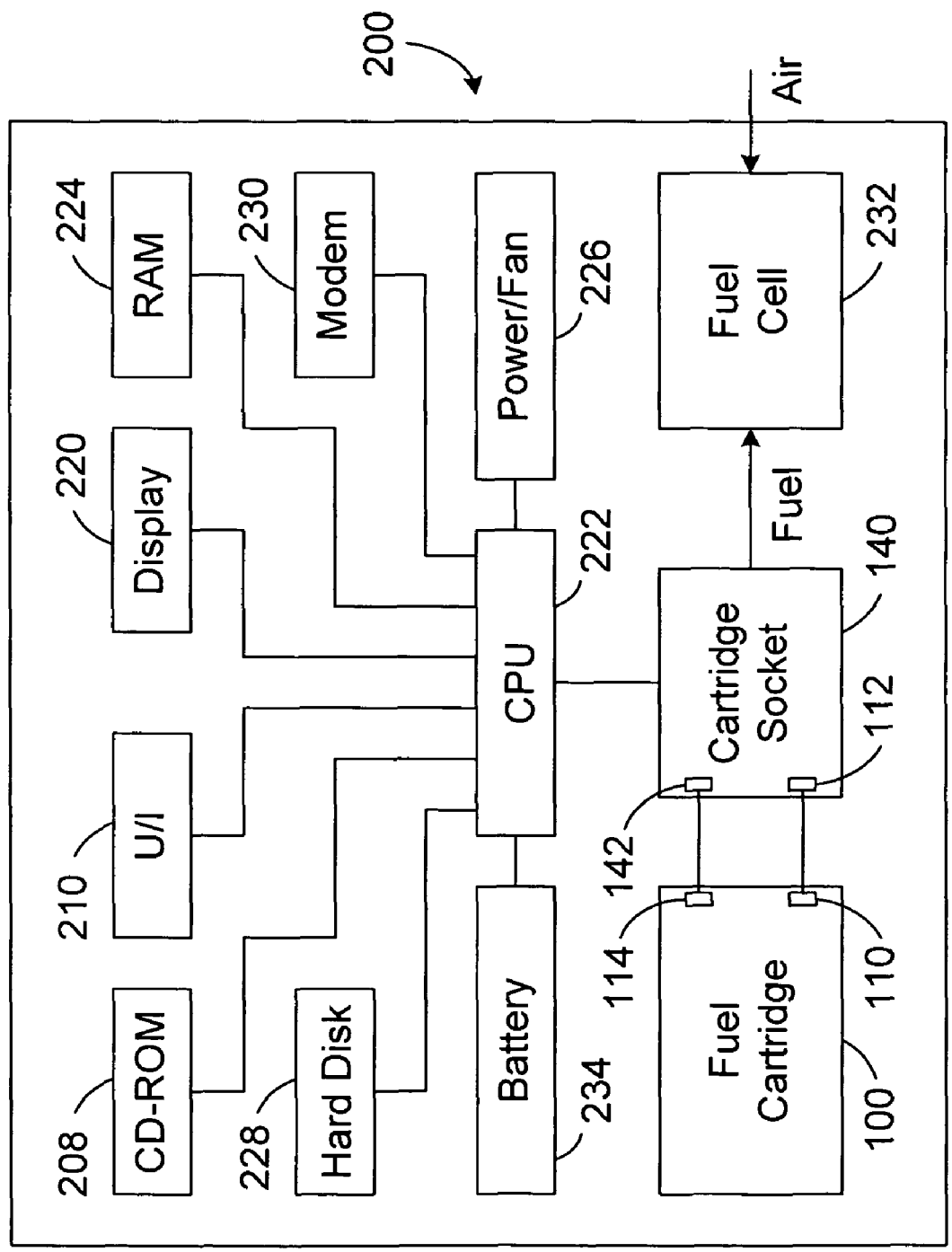
FIG. 16 is a schematic block diagram of a notebook computer and fuel cartridge in accordance with an embodiment of a present invention.

Although the present inventions are not limited to any particular shapes or sizes, one exemplary implementation of the fuel cartridge 100, which is intended for use with a notebook computer such as that illustrated in FIGS. 15 and 16, is dimensioned as follows. The exemplary base 118 is about 2 inches to 4 inches long, about 1 inch to 3 inches wide, and about 1 mm to 2 mm high (as oriented in FIGS. 1-3). The portion of the base 118 that extends beyond the barrier layer 134, thereby defining a portion of the connector 114, extends about 1 mm to 4 mm beyond the edge of the barrier layer. Additionally, the side edges of the base 118 stick out about 1 mm to 4 mm beyond the edge of the cover to form rails that may be engaged by the slots 146 described below with reference to FIGS. 10-12.

Figure 8:
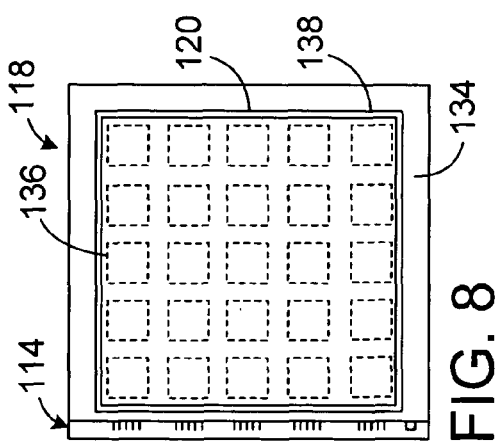
Figure 7:
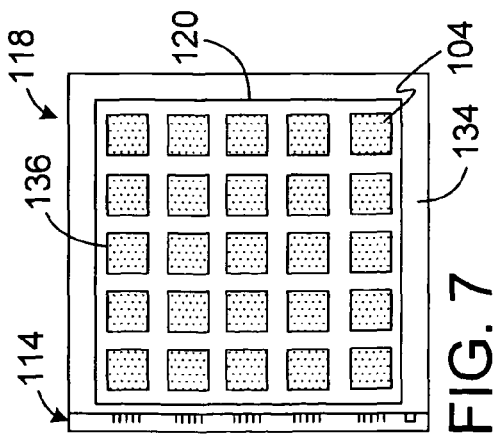

The exemplary fuel storage areas 136 are square-shaped and positioned in the array illustrated in FIGS. 6-8. Hexagons and triangles are examples of other suitable shapes and are especially useful in those configurations where the fuel storage areas 136 will be positioned in a relatively high density fashion. The size and number of fuels storage areas 136 will vary from application to application. Here, there may be 10 to 1000 fuel storage areas 136 that are about 5 microliters (μL) to 1000 μL in volume. This results in an overall fuel containing substance volume of about 50 μL to 1 L. The sides of the square fuel storage areas 136 are about 1.7 mm to 10 mm in length and the depth is about 1.7 mm to 10 mm. A suitable thermal conductivity for the material used to form the fuel storage structure 120 is about 0.1 W/mK to 0.3 w/mK. Polypropylene and ABS are examples of materials with thermal conductivity in this range. The spacing between adjacent fuel storage areas 136, which depends on the thermal conductivity of the material used to form the fuel storage structure 120, is about 0.1 mm and 3 mm in the exemplary implementation. Accordingly, with respect to the overall dimensions, the fuel storage structure 120 is about 2 inches to 4 inches in length and width and about 1 inch to 3 inches in height. The volume of the open region 108 in the exemplary implementation is about 1 cc to 15 cc and, to provide this volume, the cover 122 will be about 2 inches to 4 inches long, about 1 inch to 3 inches wide, and about 0.5 mm to 3 mm high.

It is, of course, contemplated that depending on the application and type of fuel containing substance, the size of the fuel storage structure 120 may be varied to accommodate from less than 50 μL of fuel containing substance for a small low power host device to more than 1 L for a larger high power host device. These volumes may also be increased or decreased as needed.

Turning to the mechanical, electrical and data connections between the exemplary fuel cartridge 100 and the host device, the host device may be provided with a cartridge socket 140 (FIGS. 10-12) that is configured to mate with the fuel cartridge and facilitate fuel flow to the fuel cell or other fuel consuming device. In addition to the aforementioned fluid connector 112, the cartridge socket 140 includes an electrical connector 142 and a data link 144. The cartridge socket 140 also includes a pair of slots 146 that are configured to receive the sides of the base 118 as the fuel cartridge 100 slides into the socket 140. This mechanical "keying" arrangement will guide the cartridge 100 into the socket 140 and prevent the wrong type of cartridge from being inserted into the socket. Other mechanical keying apparatus may be employed, or the mechanical keying apparatus removed as applications require. A suitable locking device, such as a latch (not shown), may also be provided to hold the fuel cartridge 100 in place.

The exemplary electrical connector 142 on the cartridge socket 140 is configured to mate with the electrical connector 114 on the fuel cartridge 100. To that end, and referring to FIG. 12, the electrical connector 142 includes a surface 148 with a plurality of contacts 150, that are positioned to mate with the conductors 126 when the fuel cartridge 100 is positioned within the cartridge socket 140, and a contact 152 that is positioned to mate with the conductor 128. The configuration of the data link 144 will depend on the configuration of the information storage device 116 and whether or not the information storage device is itself carried on the exterior of housing 102 as it is in the exemplary implementation. Here, the information storage device 116 is a flash memory device that includes a plurality of contact pads and the data link 144 includes a corresponding plurality of fingers (not shown) that engage the contact pads when the fuel cartridge 100 is within the socket 140. Other types of non-volatile memory devices, such a serial EEPROM memory chip, may also be employed.

As noted above, the information storage device 116 may be used to store data that describes the fuel type, the amount of gaseous fuel contained in each of the fuel containing substance quantities 104, and the respective amounts of energy that must be supplied to each heater 106 in order to completely release all of the gaseous fuel from the associated fuel containing substance quantity. The energy data may be in the form of, for example, power and time data (i.e. watts and seconds) and should correspond to just enough energy to cause all of the gaseous fuel in the associated fuel containing substance quantity 104 to be released. There are a variety of factors that determine how much energy is required. Such factors include the reaction rate dependence on temperature, the expected ambient temperature, the individual volumes of the fuel containing substance quantities 104, the dimensions of the fuel storage areas 136, the fuel concentration, the thermal conductivity of the materials used to form the cartridge 100, and convection around the cartridge. In the exemplary implementation described above, the energy data corresponds to about 0.17 Joule/µL of fuel containing substance. For example 1 watt for about 1.7 seconds, or 2 watts for about 0.85 seconds, may be supplied for each microliter of fuel containing substance. Higher power levels for shorter periods are preferred in order to minimize parasitic energy loss. Once the reaction has been initiated, each microliter of the aforementioned exemplary sodium borohydride solution will produce enough $H_2$ to create 10 Joules of energy.

In those instances where the fuel containing substance quantities 104 have different volumes, the information storage device 116 will include addressing data for each quantity as well as energy data that corresponds to each volume. In those instances where the host device monitors ambient temperature, the information storage device may also include energy adjustment data that will increase or decrease the amount of energy to the heaters 106 in response to changes in ambient temperature. Other fuel related information includes shelf life and service life of the cartridge. Operational data, which is provided by the host device during consumption of the fuel, may be stored on the information storage device 116 during the service life of the fuel cartridge 100. Such operational data may include, for example, marketing information (i.e. how was the host device used) and maintenance information (i.e. failure modes).

Turning to the fluid connectors 110 and 112, and although the present inventions are not limited to any particular arrangement for the connection of the fuel cartridge to the host device, the preferred arrangement is a self-sealing connector arrangement that prevents leakage. A seal will be maintained at the fluid connector 110 on the fuel cartridge 100 and the fluid connector 112 on the cartridge socket 140 when the two are connected to, and disconnected from, one another as the cartridge is received by, and removed from, the host device. Once the sealed connection is made, fuel will flow from the open region 108 within the housing 102 to the associated fuel cell or other fuel consuming device. Preferably, the connection will occur automatically when the fuel cartridge 100 is received by (e.g. inserted into or connected to) the cartridge socket 140 to connect the fuel cartridge to the host device.

One example of a self-sealing connector arrangement that may be used in conjunction with the present inventions is illustrated in FIGS. 13 and 14. The exemplary fluid connector 110 includes a hollow cylindrical boss 154 having an inwardly projecting edge 156 and lumen 158 that opens into the open region 108 within the housing 102. The end 160 includes a compliant septum 162 with a slit 164 that is secured by a crimp cap 166. A spring 168 (or other biasing device) and a sealing ball 170 are positioned between the compliant septum 162 and the inwardly projecting edge 156. The length of the spring 168 is such that the spring biases the sealing ball 170 against the septum 162 to form a seal. The end 172 of the crimp cap 166 includes an opening that is aligned with the septum slit 164.

In the exemplary implementation illustrated in FIGS. 13 and 14, the fluid connector 112 includes a needle 174 having a closed end 176, a lateral hole 178, and a bore that extends from the lateral hole axially through the needle. A sliding collar 180, which surrounds the needle 174 and is biased by a spring 182 (or other biasing device) against an annular stop 184, includes a compliant sealing portion 186 and a substantially rigid retaining portion 188. The compliant sealing portion 188 includes an exposed upper surface 190 and an inner surface 192 in contact with the needle 174. In the disconnected position illustrated in FIG. 13, the hole 178 is surrounded and sealed by the sealing portion inner surface 192. The connector 112 is also preferably provided with a tapered lead-in portion 194 that guides and centers the connector 110 as it moves into the connected position illustrated in FIG. 14.

When the connector 110 is inserted into the fluid connector 112 (FIG. 14) in order to establish a connection between the fuel cartridge 100 and the host device, the closed end 176 of the needle 174 will pass through the septum slit 164. The septum 162 should, therefore, be compliant enough to allow the needle 174 to be inserted without large insertion forces, yet stiff enough to provide a tight seal when the needle is removed. As the needle 174 passes through the septum 162 into the cylindrical boss 154, the sliding collar 180 and sealing ball 170 will be urged in opposite directions until the hole 178 is exposed. This establishes communication between the fuel cartridge 100 and the host device. Additional details concerning the exemplary connector arrangement illustrated in FIGS. 13 and 14 may be found in U.S. Pat. No. 6,015,209, which is incorporated herein by reference.

Although the present inventions are not limited to use with any particular host device, the fuel cell powered notebook computer 200 illustrated in FIGS. 15 and 16 is one example of a host device having elements that consume electrical power, as well as a device that generates the electrical power, which may be fueled by the fuel cartridges described above. Other exemplary host devices include, but are not limited to, personal digital assistants, digital cameras, portable telephones and games. The present fuel cartridges may also be used in conjunction with stand alone power generators that may be connected to separate power consuming devices in order to provide power thereto.

The exemplary notebook computer 200 is, with respect to many of the structural and operating components, substantially similar to conventional portable computers such as the Hewlett-Packard Omnibook 6000 notebook PC. More specifically, the exemplary portable computer 200 includes structural components such as a main housing 202 and a display housing 204 that is pivotably connected to the main housing by a hinge 206. The main housing 202 includes a module bay for optional modules such as the illustrated CD-ROM drive module 208, a 3.5 inch disk drive module, or a ZIP drive module. The exemplary main housing 202 is also provided with a user interface 210 that allows the user to interact with the computer 200. The user interface 210 includes a keyboard 212, a touch pad 214, a first pair of right/left click buttons 216 and a second pair of right/left click buttons 218. Each of these elements operates in conventional fashion to control the operations of the computer 200 and application programs running thereon. In addition to supporting a display 220, the display housing 204 also acts as a lid to cover the user interface 210 when in the closed position. To that end, a conventional latch arrangement (not shown) may be provided to lock the free end of the display housing 204 to the main housing 202 and maintain the display housing in the closed position.

The operating components of the exemplary computer 200 illustrated in FIGS. 15 and 16 include a CPU (or "processor") 222, cache and RAM memory 224, a power adapter and fan arrangement 226, a hard disk drive 228 and a modem 230. The exemplary portable computer 200 may also include other conventional components such as, for example, audio and video cards, headphone and microphone ports, serial, parallel and USB ports, keyboard and mouse ports, a 240-pin PCI connector for docking, an operating system such as Microsoft® Windows, and various application programs such a word processing, spreadsheets, security programs and games.

The exemplary notebook computer 200 also includes a fuel cell system 232, or other fuel consuming/power generating device, that is connected to various electrical loads within the computer. The exemplary fuel cell system 232 is a fuel cell stack consisting of a plurality of cells. Although the present inventions are not limited to any particular type of fuel cell system, the exemplary fuel cells are PEM fuel cells, which include an anode and a cathode separated by a PEM. Gaseous fuel, such as hydrogen, is supplied to the anode and oxygen supplied to the cathode. In the illustrated embodiment, oxygen may be supplied to the fuel cell stack by drawing ambient air into the stack through a vent in the housing 202. A fan may be provided to facilitate this process. The byproduct (water vapor and nitrogen in the exemplary embodiment) is carried away from the fuel cell system 232 by a manifold and vented out of the housing 202. The notebook computer 200 or other host device should also include a battery 234 to provide power to the heaters 106 and the power consuming devices (e.g. the CPU 222) prior to the initial transfer of fuel to the fuel cell system 232. Such power would be used to, for example, power the system processor prior to the production of power by the fuel cell system 232.

During operation of the exemplary computer 200, the heaters 106 in the exemplary fuel cartridge 100 will be selectively actuated by connecting them to a voltage source and ground within the computer, by way of the connectors 114 and 142, in order to provide fuel for the fuel cell system 232. One or more of the heaters will be actuated, when the cartridge 100 is initially connected to the computer 200 or the first time the computer is used after the initial connection, in order to create a sufficient amount of pressurized fuel to fuel the fuel cell system 232. Alternatively, the open region 108 may be filled with a small amount of pressurized fuel (such as hydrogen gas) during the fuel cartridge manufacturing process. This fuel, which will flow under pressure to the fuel cell system 232 when the connectors 110 and 112 mate, may be used to fuel the fuel cell system prior to actuation of the heaters 106. Actuation of the heaters 106 may be controlled by the system processor 222 (or a separate controller), based on the data stored on the information storage device 116, along with the other components and sub-systems (sometimes referred to as "balance of plant" components and systems) that control of the exemplary PEM fuel cell system. A feedback loop is one exemplary method of controlling the production of fuel within the fuel cartridge 100. Such control would include the rate of fuel production in addition to whether or not fuel is being produced at all.

Although the present inventions have been described in terms of the preferred embodiments above, numerous modifications and/or additions to the above-described preferred embodiments would be readily apparent to one skilled in the art. It is intended that the scope of the present inventions extend to all such modifications and/or additions.

We claim:

1. A fuel cartridge, comprising:
   a fuel containing substance that releases fuel in response to an application of heat;
   a heater, in thermal communication with the fuel containing substance, that heats the fuel containing substance in response to a receipt of energy; and
   an information storage device that stores an energy value corresponding to the minimum amount of energy that, when supplied to the heater, will cause the fuel containing substance to release all of the fuel contained therein.

2. A fuel cartridge as claimed in claim 1, wherein the fuel containing substance comprises a sodium borohydride solution.

3. A fuel cartridge as claimed in claim 1, wherein the heater comprises a resistor.

4. A fuel cartridge as claimed in claim 1, wherein the information storage device comprises a non-volatile memory device.

5. A fuel cartridge as claimed in claim 1, wherein the energy value comprises a power value and a time value.

6. A fuel cartridge as claimed in claim 1, wherein
   the fuel containing substance comprises a plurality of individual fuel containing substance quantities;
   the heater comprises a plurality of individually actuatable heaters respectively in thermal communication with the plurality of fuel containing substance quantities; and
   the information storage device stores an energy value corresponding to each of the fuel containing substance quantities.

7. A fuel cartridge as claimed in claim 6, wherein the plurality of individual fuel containing substance quantities are respectively stored in a plurality of individual fuel storage areas.

8. A fuel cartridge as claimed in claim 1, further comprising:
a housing defining an exterior and an interior that stores the fuel containing substance;
wherein the information storage device is located within the interior of the housing, or is carried on the exterior of the housing, or is located within its own housing.

9. A fuel cartridge, comprising:
a fuel containing substance that releases fuel in response to an application of heat;
means for heating the fuel containing substance in response to a receipt of energy; and
means for storing an energy value that corresponds to the minimum amount of energy that, when supplied to the means for heating, will cause the fuel containing substance to release all of the fuel contained therein.

10. A fuel cartridge as claimed in claim 9, wherein the fuel containing substance comprises a sodium borohydride solution.

11. A fuel cartridge as claimed in claim 9, wherein the energy value comprises a power value and a time value.

12. A fuel cartridge as claimed in claim 9, wherein the fuel containing substance comprises a plurality of individual fuel containing substance quantities;
the means for heating comprises means for individually heating the plurality of fuel containing substance quantities; and
the means for storing an energy value comprises means for storing an energy value corresponding to each of the fuel containing substance quantities.

13. A device, comprising:
an electrochemical cell; and
a fuel cartridge, operably connected to the electrochemical cell, including
a fuel containing substance that releases fuel in response to an application of heat,
a heater, in thermal communication with the fuel containing substance, that heats the fuel containing substance in response to a receipt of energy, and
an information storage device that stores an energy value corresponding to the minimum amount of energy that, when supplied to the heater, will cause the fuel containing substance to release all of the fuel contained therein.

14. A device as claimed in claim 13, wherein the electrochemical cell comprises a PEM fuel cell.

15. A device as claimed in claim 13, further comprising:
an apparatus that consumes electrical power operably connected to the electrochemical cell.

16. A device as claimed in claim 13, wherein the fuel cartridge includes a fuel cartridge connector, the device further comprising:
a device connector, in fluid communication with the electrochemical cell, configured to be releasably coupled to the fuel cartridge connector.

17. A device as claimed in claim 13, wherein the fuel containing substance comprises a sodium borohydride solution.

18. A device as claimed in claim 13, wherein the heater comprises a resistor.

19. A device as claimed in claim 13, wherein the information storage device comprises a non-volatile memory device.

20. A device as claimed in claim 13, wherein
the fuel containing substance comprises a plurality of individual fuel containing substance quantities;
the heater comprises a plurality of individually actuatable heaters respectively in thermal communication with the plurality of fuel containing substance quantities; and
the information storage device stores an energy value corresponding to each of the fuel containing substance quantities.

21. A device as claimed in claim 20, wherein the plurality of individual fuel containing substance quantities are respectively stored in a plurality of individual fuel storage areas.

22. A device as claimed in claim 13, wherein
the fuel cartridge includes a housing defining an exterior and an interior that stores the fuel containing substance; and
the information storage device is located within the interior of the housing, or is carried on the exterior of the housing, or is located within its own housing.

23. A device as claimed in claim 13, further comprising:
an energy source; and
a controller adapted to receive the energy value and control the energy source to supply the heater with the amount of energy that corresponds to the energy value.

24. A device as claimed in claim 13, wherein the energy value comprises a power value and a time value.

25. A fuel cartridge as claimed in claim 9, further comprising:
a housing defining an exterior and an interior that stores the fuel containing substance;
wherein the means for storing an energy value is located within the interior of the housing, or is carried on the exterior of the housing, or is located within its own housing.

* * * * *